(12) United States Patent
Wang et al.

(10) Patent No.: US 11,325,278 B2
(45) Date of Patent: May 10, 2022

(54) METHOD AND SYSTEM OF OPTIMIZING PRINTING OF CERAMIC ISOLATION LAYER

(71) Applicant: Suzhou Fusion Tech Co., Ltd., Suzhou (CN)

(72) Inventors: Jun Wang, Suzhou (CN); Hanshen Wang, Suzhou (CN); Jingwei Hu, Suzhou (CN); Hua Feng, Suzhou (CN); Jianzhe Li, Suzhou (CN); Jinjing Zhang, Suzhou (CN); Xiaoyu Wu, Suzhou (CN); Wangping Long, Suzhou (CN)

(73) Assignee: Suzhou Fusion Tech Co., Ltd., Suzhou (CN)

( * ) Notice: Subject to any disclaimer, the term of this patent is extended or adjusted under 35 U.S.C. 154(b) by 0 days.

(21) Appl. No.: 17/445,319

(22) Filed: Aug. 18, 2021

(65) Prior Publication Data
US 2022/0063127 A1 Mar. 3, 2022

(30) Foreign Application Priority Data
Aug. 25, 2020 (CN) .......................... 202010866769.7

(51) Int. Cl.
*B28B 1/00* (2006.01)
*B28B 17/00* (2006.01)
(Continued)

(52) U.S. Cl.
CPC .......... *B28B 1/001* (2013.01); *B28B 17/0081* (2013.01); *B33Y 10/00* (2014.12); *B33Y 50/02* (2014.12)

(58) Field of Classification Search
None
See application file for complete search history.

(56) References Cited

U.S. PATENT DOCUMENTS 6,936,212 B1 * 8/2005 Crawford ............... B33Y 10/00
264/308
8,063,540 B2 * 11/2011 Angelsen .............. B06B 1/0692
310/334

(Continued)

FOREIGN PATENT DOCUMENTS

CN 102971099 A 3/2013
CN 108746626 A 11/2018
(Continued)

*Primary Examiner* — Monica A Huson
*Assistant Examiner* — Kelsey C Grace
(74) *Attorney, Agent, or Firm* — Avek IP, LLC (57) ABSTRACT

Disclosed are methods and systems for optimizing printing of a ceramic isolation layer. In some embodiments, the method includes the following steps: preparing a workpiece before printing; printing the workpiece by an optimal printing solution, the optimal printing solution satisfying a setting of key data when printing the ceramic isolation layer; and processing the workpiece after printing to obtain a finished workpiece. In other embodiments, the optimal printing solution is determined by the following steps: printing and processing the ceramic isolation layer and the workpiece isolated by the ceramic isolation layer for multiple times; adjusting the key data by determining a strength of the ceramic isolation layer after printing and deformation data of the workpiece; selecting the ceramic isolation layer parameters and the printing parameters; and taking the setting of the key data as the optimal solution when the deformation data reaches a preset threshold.

6 Claims, 5 Drawing Sheets

(51) Int. Cl.
*B33Y 50/02* (2015.01)
*B33Y 10/00* (2015.01)

(56) References Cited

U.S. PATENT DOCUMENTS

2013/0278689 A1* 10/2013 Sowinski ............. C09D 11/322
   347/90
2017/0190104 A1* 7/2017 Bostick ................. B29C 64/106
2018/0154437 A1* 6/2018 Mark .................... B22F 1/0085

FOREIGN PATENT DOCUMENTS

| CN | 111360253 A | 7/2020 |
| CN | 111482597 A | 8/2020 |
| WO | 2020061544 A1 | 3/2020 |

* cited by examiner

METHOD AND SYSTEM OF OPTIMIZING PRINTING OF CERAMIC ISOLATION LAYER

CROSS REFERENCE TO RELATED APPLICATIONS

This application claims priority to Chinese application number 202010866769.7, filed on Aug. 25, 2020, the disclosure of which is incorporated by reference herein in its entirety.

FIELD OF THE DISCLOSURE

The disclosure relates generally to three-dimensional (3D) printing. More specifically, the disclosure relates to methods and systems of optimizing printing of a ceramic isolation layer.

BACKGROUND

Along with the continuous development of a three-dimensional (3D) printing technology, fusion deposition printing technology has been widely applied to various fields, such as 3D printing of metal.

In an application of the conventional 3D printing art, when a ceramic isolation layer is used to isolate a support structure from a workpiece, inconsistency of shrinkage of the ceramic isolation layer and the workpiece will seriously affect the shrinkage behavior of the workpiece above the support structure. As a result, shrinkage of a contact part of the workpiece after sintering and the support structure will be inconsistent with those of other parts of the workpiece, a bottom layer of the workpiece will be rough and a surface will be poor in quality because of the combination of the ceramic isolation layer and the workpiece, and accordingly, the workpiece itself will be subject to great deformation.

Therefore, when the support structure is isolated from the workpiece by the ceramic isolation layer in the conventional art, the workpiece that is finally sintered will be subject to the great deformation.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a method of optimizing printing of a ceramic isolation layer. The method includes the following steps: preparing a workpiece before printing; printing the workpiece by an optimal printing solution, the optimal printing solution satisfying a setting of key data when printing the ceramic isolation layer; and processing the workpiece after printing to obtain a finished workpiece.

The optimal printing solution is determined by the following steps: printing and processing the ceramic isolation layer and the workpiece isolated by the ceramic isolation layer for multiple times; adjusting the key data by determining a strength of the ceramic isolation layer after printing and deformation data of the workpiece; selecting the ceramic isolation layer parameters and the printing parameters by evaluating the deformation data of the workpiece after sintering; and taking the setting of the key data as the optimal solution when the deformation data reaches a preset threshold.

The key data includes ceramic isolation layer parameters and printing parameters; the ceramic isolation layer parameters include printing pattern, number of the ceramic isolation layers, and size of the ceramic isolation layer; the printing parameters include a deflection angle of linear infilling, a distance between printed layers, a printing starting point, an infilling density, and a flowrate; the deflection angle ranges from 0 to 90 degrees, the infilling density ranges from 0 to 100%, the flowrate ranges from 0 to 150%, and the distance between the printed layers ranges from 0 to 5 mm; and the deformation data include the strength of the isolation layer, a bonding strength between the workpiece and the isolation layer, and a flatness of a contact surface between the isolation layer and the workpiece.

Optionally, the step of preparing the workpiece before printing includes the following steps: importing a model of the workpiece into a slicing software of a three-dimensional (3D) printer; adjusting a model status of the workpiece in the slicing software of the 3D printer; setting the printing parameters and slicing parameters in the slicing software of the 3D printer to implement slicing and to generate a support; and preparing a printing material. The model status of the workpiece includes a printing direction, a position, a size, and an orientation of the model. Preparing a printing material includes preparation of a raw material and processing of the raw material into a printing filament coil.

Optionally, the step of processing the workpiece after printing, upon the printing of the workpiece is finished, includes the following steps sequentially: debinding the workpiece; sintering the workpiece; and removing a support part.

Optionally, debinding the workpiece, upon the printing of the workpiece is finished, includes the following steps: preheating the workpiece in a catalytic debinding furnace; ventilating to clean an atmosphere in the catalytic debinding furnace; and charging an acid solution for debinding when the catalytic debinding furnace is stabilized.

Optionally, sintering the workpiece includes positioning a debinded sample into a sintering furnace for sintering when the workpiece is debinded.

Optionally, removing the support part includes removing the support part of the workpiece by a physical method when the workpiece is sintered to obtain the finished workpiece.

Optionally, the disclosure further provides a system of optimizing printing of a ceramic isolation layer includes a printing device, the printing device being configured to execute the above methods.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

It is to be noted that terms "first", "second" and the like in the description, claims and the above-mentioned drawings of the application are used for distinguishing similar objects rather than describing a specific sequence or a precedence order. It should be understood that the data used in such a way may be exchanged where appropriate, in order that the embodiments of the application described here can be implemented. In addition, terms "include" and "have", and any variations thereof are intended to cover non-exclusive inclusions. For example, it is not limited for processes, methods, systems, products, or devices containing a series of steps or units to clearly list those steps or units, and other steps or units which are not clearly listed or are inherent to these processes, methods, products, or devices may be included instead.

In the application, orientation or position relationships indicated by terms "upper", "lower", "left", "right", "front", "back", "top", "bottom", "inside", "outside" "in", "vertical", "horizontal", "transverse", "longitudinal" and the like are orientation or position relationships shown in the drawings. These terms are mainly used to better describe the application and its embodiments, rather than limit that the indicated devices, components and constituting parts must be in specific orientations or structured and operated in the specific orientations.

Furthermore, the above-mentioned part of terms may be not only used to represent the orientation or position relationships, but used to represent other meanings, for example, term "on" may be used to represent certain relationship of dependence or connection relationship in some cases. For those of ordinary skill in the art, specific meanings of these terms in the application may be understood according to a specific condition.

In addition, terms "mount", "configure", "provide", "connect", "link" and "sleeved" should be broadly understood. For example, the term "connect" may be fixed connection, detachable connection, or integral construction. As an alternative, the term "connect" may be mechanical connection, or electrical connection. As an alternative, the term "connect" may be direct connection, or indirect connection through a medium, or communication in two devices, components or constituting parts. For those of ordinary skill in the art, specific meanings of the above-mentioned terms in the disclosure may be understood according to a specific condition.

Figure 1:
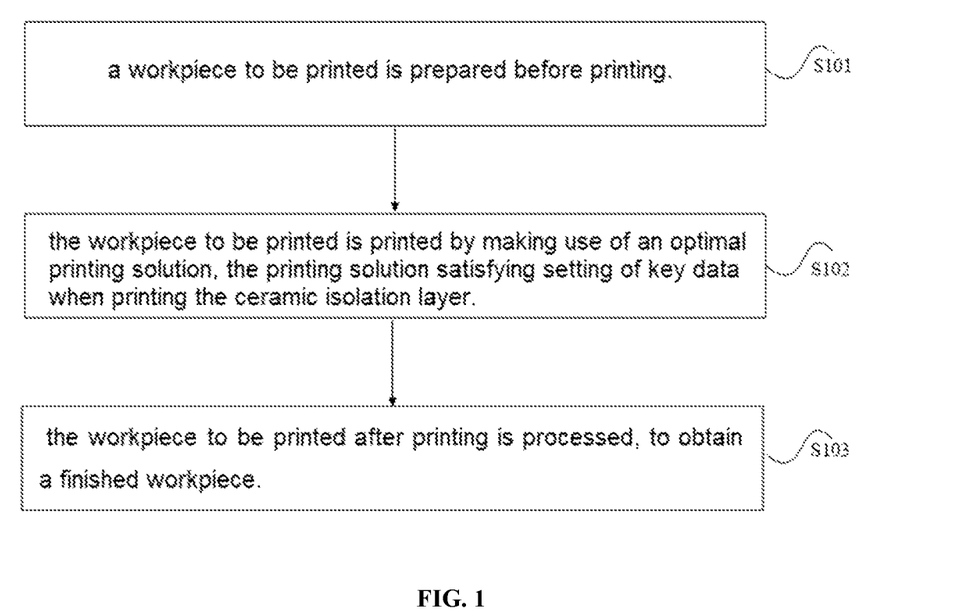
FIG. 1 is a flow diagram illustrating a method of optimizing printing of a ceramic isolation layer according to an embodiment of the disclosure.

FIG. 1 is a flow diagram illustrating a method of optimizing printing of a ceramic isolation layer according to an embodiment of the disclosure. As shown in FIG. 1, the method may include the following steps.

S101: a workpiece to be printed is prepared before printing.

Figure 2:
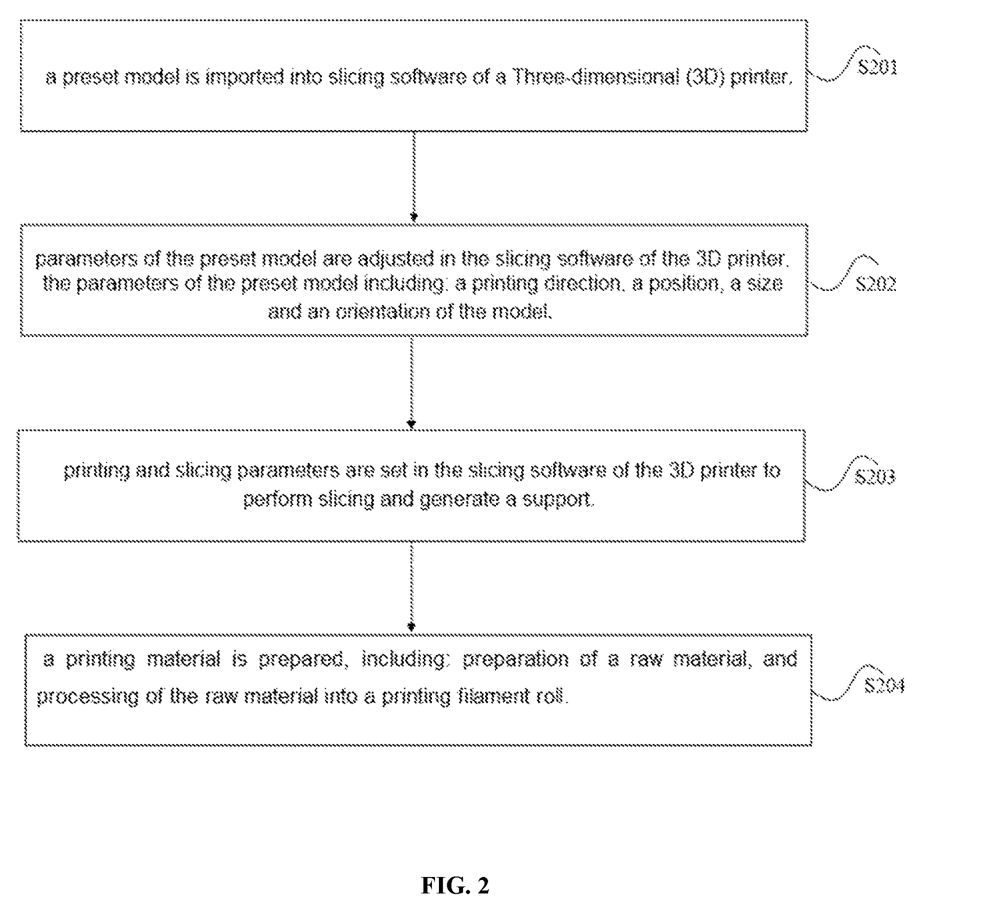
FIG. 2 is a flow diagram illustrating a step of preparing a workpiece before printing in a method of optimizing printing of a ceramic isolation layer according to an embodiment of the disclosure.

FIG. 2 is a flow diagram illustrating a step of preparing a workpiece to be printed before printing in a method of optimizing printing of a ceramic isolation layer according to an embodiment of the disclosure. The preparation step may include the following steps.

S201: a preset model is imported into slicing software of a three-dimensional (3D) printer. The required preset model may be imported into IdeaMaker® software, and the preset model may be in stl format.

S202: parameters of the preset model are adjusted in the slicing software. The parameters of the preset model may include the printing direction, the position, the size, and the orientation of the model. Optionally, the preset model is rotated in the software to adjust the printing direction, to adjust the position of the model, and to adjust the size and the orientation to reasonable statuses.

S203: printing and slicing parameters are set in the slicing software of the 3D printer to perform slicing and to generate a support.

The steps that the printing and slicing parameters are set in the software, and the slicing is performed, and the support is generated for a printing model may further include the following steps.

(1) The IdeaMaker® software analyzes the model to obtain position parameters of all data points on a surface of the model.

(2) The software performs the slicing for a workpiece body according to a layer height set by the parameters. The model may be processed into an integer number of slice layers and each with a thickness equal to the set layer height.

(3) The software calculates layer by layer from bottom to top.

(4) The software obtains a numerical value of an included angle formed by a surface of the model where a current layer is positioned and a horizontal plane.

(5) The software determines whether the numerical value of the included angle is greater than a critical angle for generation of the support when setting the parameters.

(6) A cylinder is generated for a patch of the current layer when the software obtains that the included angle is greater than the specific angle.

(7) In a previous step, a top surface of the cylinder is taken as a model patch of the current layer, and a bottom surface is taken as a part patch, or a printing base plate encountered in a projection direction.

(8) The software calculates layer by layer until a top layer is ended.

(9) The software synthesizes all the generated cylinders to obtain a model of the support and the workpiece body.

S204: a printing material is prepared. The preparation may include a preparation of a raw material and processing of the raw material into a printing filament roll.

The preparation of the printing material may include the following steps.

(1) Alloy powder (reduced/atomized/carbonyl/electrolytic powder, iron/chromium/nickel/carbon/manganese/molybdenum/silicon and other powders are taken according to a formula, D50 may be 1-100 microns) required by production of a filament, a polymer binder/dispersant/stabilizer/plasticizer/lubricant (Polyoxymethylene (POM) prevails in terms of the polymer component, and Stearic Acid (SA)/Paraffin Wax (PW)/Polyethylene (PE)/Polypropylene (PP)/Acrylonitrile Butadiene Styrene (ABS)/Ethyl Vinyl Acetate (EVA)/Polyamide (PA)/Maleic acid graft is added) and other additives are prepared.

(2) A formula of the alloy powder may be changed accordingly along with different printing filaments. For example, 316L stainless steel has a specific ratio of the powders as follows: 0-0.03% of carbon powder, 16-18% of chromium powder, 10-14% of nickel powder, 0-2% of manganese powder, 2-3% of molybdenum powder, 0-1% of silicon powder, and 62-72% of iron powder.

(3) A formula of the polymer binder may be changed along with different debinding methods and production methods of the filament and feedstock. For one of plastic-based materials, ingredients may include: 60-90% of polyoxymethylene, 0-10% of polypropylene, 0-10% of paraffin wax, 0-5% of stearic acid, 0-5% of antioxidant, and 0-5% of other polymer additives.

(4) The ratio of the alloy powder used in raw material powder of stainless-steel filament to the polymer binder may be: 40-90% of the alloy powder, and 10-60% of the polymer binder.

(5) The raw material powder (metal powder/alumina powder+polymer substance) is added into an integrated mixing and granulating machine (or a mixer+a granulator) according to the above-mentioned ratio, for preparing granular feedstock through mixing and granulation.

(6) The processed feedstock is fed into an extruder (a screw extruder/a twin screw extruder/a non-screw extruder, etc.) to melt, extrude, stretch, and bend to produce the printing filament roll.

S102: the workpiece to be printed is printed by an optimal printing solution, the printing solution satisfying setting of key data when printing the ceramic isolation layer.

The process of printing the workpiece to be printed may include the following steps.

(1) A slicing process of the model is completed by optimized parameters.

(2) A model document after slicing is imported into the printer.

(3) The printer is subject to height calibration, namely, a printing nozzle is used to print the filament within a certain height range, and the best printing height is determined and set.

(4) The printing base plate is subject to level calibration, the printing nozzle moves horizontally on the printing base plate to determine flatness of the printing base plate, and a height knob of the base plate is adjusted to an appropriate range.

(5) The sliced model is selected on a control screen of the printer and the printing is started.

(6) The printer preheats the printing nozzle and the printing base plate until they reach specified temperatures.

(7) The printer controls the printing nozzle to move according to a planned path of the printing model.

(8) The nozzle moves upward for the height of a single layer to print the next layer upon ending of printing of the printer on a current sliced layer.

(9) The printing nozzle prints layer by layer until a highest layer is printed.

Figure 3:
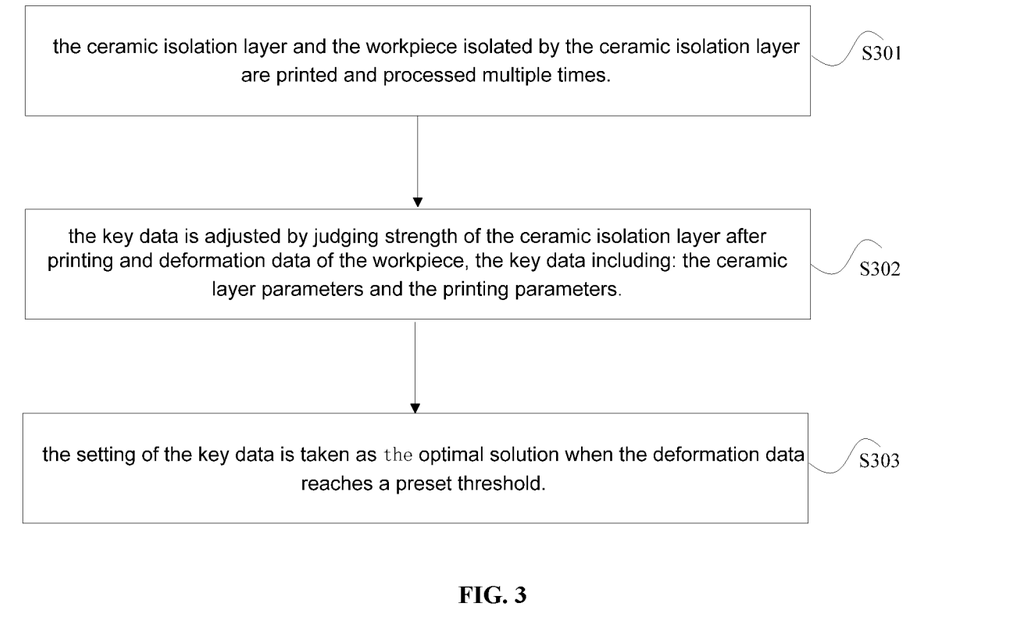
FIG. 3 is a flow diagram illustrating a step of determining the optimal printing solution in a method of optimizing printing of a ceramic isolation layer according to a further embodiment of the disclosure.

FIG. 3 is a flow diagram illustrating an implementation process of determining the optimal printing solution in a method of optimizing printing of a ceramic isolation layer according to a further embodiment of the disclosure. The implementation process may include the following steps.

S301: the ceramic isolation layer and the workpiece isolated by the ceramic isolation layer are printed and processed multiple times.

The ceramic isolation layer and the workpiece may be printed by different ceramic isolation layer parameters and different printing parameters.

The workpieces printed with the different ceramic isolation layer parameters and the different printing parameters may subject to subsequent uniform debinding and sintering.

S302: the key data is adjusted by determining strength of the ceramic isolation layer after printing and deformation data of the workpiece. The key data may include the ceramic layer parameters and the printing parameters.

The ceramic isolation layer parameters may include: the printing pattern, the number of the ceramic isolation layers, and the size of the ceramic isolation layer.

The printing parameters may include: the deflection angle of linear infilling, the distance between printed layers, the printing starting point, the infilling density, and the flowrate.

In the above-mentioned printing parameters, the selectable deflection angle may be 0-90 degrees, the infilling density may be 0-100%, the flowrate may be 0-150%, and the distance between the printed layers may be 0-5 mm.

The appropriate ceramic isolation layer parameters and the appropriate printing parameters may be selected by evaluating the deformation data of the workpiece after sintering. The deformation data may include the strength of the isolation layer, bonding strength between the workpiece and the isolation layer, and flatness of a contact surface between the isolation layer and the workpiece.

S303: the setting of the key data is taken as the optimal solution when the deformation data reaches a preset threshold.

S103: the workpiece to be printed after printing is processed to obtain a finished workpiece.

The workpiece to be printed is debinded and sintered and a support part is removed sequentially upon ending of printing of the workpiece to be printed.

Figure 4:
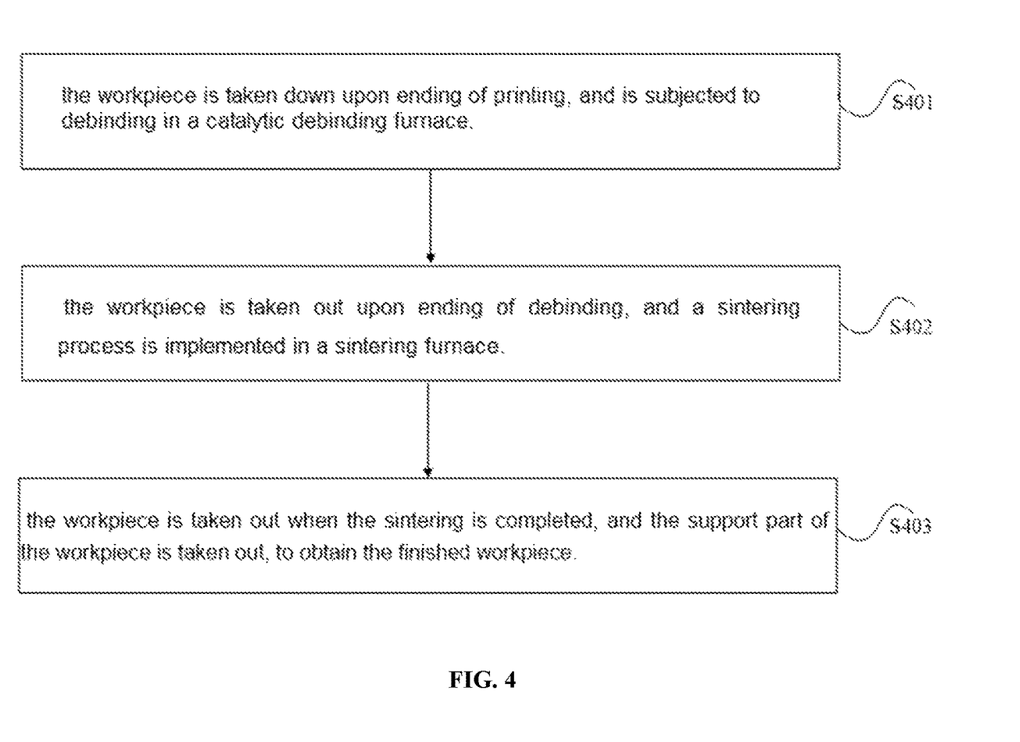
FIG. 4 is a flow diagram illustrating a process of processing a workpiece after printing according to an embodiment of the disclosure.

FIG. 4 shows a process of processing a workpiece to be printed after printing, and the process may include the following steps.

S401: the workpiece is taken down upon ending of printing and is subject to debinding in a catalytic debinding furnace.

The step S401 may include the following steps.

(1) A shovel and other tools are used to take down the workpiece from the printing base plate upon ending of printing.

(2) The workpiece is put into the catalytic debinding furnace.

(3) The catalytic debinding furnace is preheated, and ventilation is used to clean an atmosphere in the furnace, nitrogen, or argon with a purity of >99.99% being used in the debinding furnace, and a debinding temperature being at 100-200° C.

(4) An acid solution is started to be charged for debinding when the catalytic debinding furnace is stabilized, the acid being nitric acid or oxalic acid, a nitric acid aqueous solution with a concentration of 69% being taken as the nitric acid, and an oxalic acid alcohol solution with a concentration of 10-40% being taken as the oxalic acid, the charging speed of the acid solution being at 0-10 ml/min.

S402: the workpiece is taken out upon ending of debinding, and a sintering process is implemented in a sintering furnace.

The step S402 may include the following steps.

(1) When the catalytic debinding is ended, a furnace door is opened after a program of the debinding furnace is ended and cooling is completed, and a debinded sample is taken out.

(2) The debinded sample is put into the sintering furnace for sintering.

(3) During the sintering process, the heating rate is 1-10° C./min, the sintering temperature is at 1150-1450° C., the sintering is implemented for 1-5 hours, the argon is charged during sintering, and the flow is 0-10000 ml/min.

S403: the workpiece is taken out when the sintering is completed, and the support part of the workpiece is taken out to obtain the finished workpiece.

The workpiece is taken out when the sintering is completed, and the support part of the workpiece is removed with a physical method to obtain the final finished workpiece.

Figure 5:
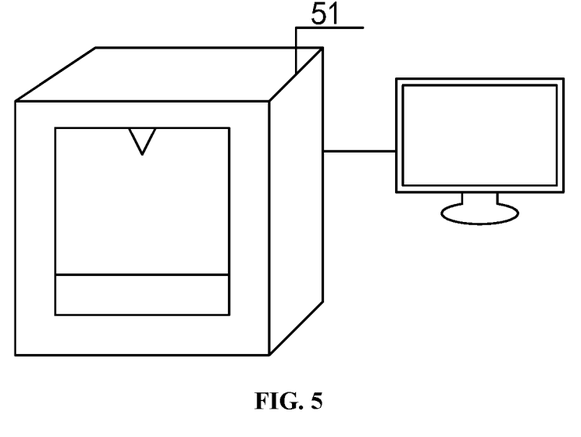
FIG. 5 is a schematic structural diagram of a system of optimizing printing of a ceramic isolation layer according to an embodiment of the disclosure.

FIG. 5 is a schematic structural diagram of a system of optimizing printing of a ceramic isolation layer according to an embodiment of the disclosure.

A printing device 51 may be included to implement methods and steps corresponding to FIGS. 1-3. For a specific implementation process, the diagrams and descriptions corresponding to FIGS. 1-3 may be used for reference and will not be repeated here.

To sum up, with the adoption of the method of optimizing printing of the ceramic isolation layer, the workpiece may be printed by the optimal printing solution. The printing solution satisfies the setting of the key data when printing the ceramic isolation layer, and the setting of the key data may include the processing of workpiece after printing with the optimized ceramic layer parameters and the printing parameters to obtain the finished workpiece. The bonding strength between the ceramic isolation layer and the workpiece may be reduced, in this way deformation of the workpiece may be avoided, the deformation of the workpiece affected by the ceramic layer may be optimized, and accordingly probability of serious deformation of the workpiece itself during sintering may be reduced, and a success rate of sintering the workpiece may be improved.

It is to be noted that the steps shown in the flow diagram of the accompanying drawings may be executed in a computer system, such as a set of computer-executable instructions, and although a logical sequence is shown in the flow diagram, in some cases, the steps shown or described may be executed in a different order than here.

It is apparent that those skilled in the art should understand that the above-mentioned units or steps of the application may be implemented by a general computing device and may also be gathered on a single computing device or distributed in network composed of multiple computing devices. Optionally, the above-mentioned units or steps of the application may be implemented with program codes executable by the computing device, so that may be stored in a storage device for execution by the computing device or can be fabricated into individual integrated circuit modules respectively, or multiple modules or steps thereof are fabricated into a single integrated circuit module for implementation. In this way, the application is not limited to any specific combination of hardware and software.

An objective of the application is to provide methods of optimizing printing of a ceramic isolation layer, which may help to solve the problem that a workpiece is subject to a great deformation, thus improving the success rate of sintering the workpiece. To achieve such an objective, the disclosure provides methods of optimizing printing of a ceramic isolation layer. Additionally, the disclosure provides systems of optimizing printing of a ceramic isolation layer.

Various embodiment of the disclosure may have one or more of the following effects. In some embodiments, the disclosed methods and systems may reduce probabilities and/or possibilities of deformation of the workpiece as a result of influence of the ceramic isolation layer during sintering. In other words, the disclosed methods and systems may improve the success rate of the sintering of the workpiece. In other embodiments, with the adoption of methods and systems of optimizing printing of the ceramic isolation layer, the workpiece may be printed through the optimal printing solution in allusion to the technical problem that the finally sintered workpiece has the great deformation when the support structure is isolated from the workpiece by the ceramic isolation layer in the conventional art. In further embodiments, the printing solution may satisfy the setting of the key data when printing the ceramic isolation layer, and the setting of the key data may include the processing of the workpiece after printing based on the optimized ceramic layer parameters and the optimized printing parameters, as to obtain the finished workpiece. Additionally, bonding strength between the ceramic isolation layer and the workpiece may be reduced, which may help to avoid and/or reduce deformation of the workpiece. The deformation of the workpiece affected by the ceramic layer may be optimized, and accordingly, probabilities and/or possibilities of deformation of the workpiece during sintering may be reduced, and the success rate of sintering the workpiece may be improved.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A method of optimizing printing of a ceramic isolation layer, comprising:
preparing a workpiece;
printing the workpiece by an optimal printing solution via a fused deposition printing method, the optimal printing solution satisfying a setting of key data when printing the ceramic isolation layer; and
processing the workpiece after printing to obtain a finished workpiece;
wherein:
the optimal printing solution is determined by the following steps:
printing and processing the ceramic isolation layer and the workpiece isolated by the ceramic isolation layer for multiple times via the fused deposition printing method;
adjusting the key data by determining a strength of the ceramic isolation layer after printing and deformation data of the workpiece;
wherein:
the key data comprises ceramic isolation layer parameters and printing parameters;
the ceramic isolation layer parameters comprise printing pattern, number of the ceramic isolation layers, and size of the ceramic isolation layer;

the printing parameters comprise a deflection angle of linear infilling, a distance between printed layers, a printing starting point, an infilling density, and a flowrate;

the deflection angle ranges from 0 to 90 degrees, the infilling density ranges from 0 to 100%, the flowrate ranges from 0 to 150%, and the distance between the printed layers ranges from 0 to 5 mm;

selecting the ceramic isolation layer parameters and the printing parameters by evaluating the deformation data of the workpiece after sintering, the deformation data comprising: the strength of the isolation layer, a bonding strength between the workpiece and the isolation layer, and a flatness of a contact surface between the isolation layer and the workpiece; and taking the setting of the key data as the optimal solution when the deformation data reaches a preset threshold.

2. The method of claim 1, wherein the step of preparing the workpiece before printing comprises the steps of:

importing a model of the workpiece into a slicing software of a three-dimensional (3D) printer;

adjusting a model status of the workpiece in the slicing software of the 3D printer, the model status of the workpiece comprising: a printing direction, a position, a size, and an orientation of the model;

setting the printing parameters and slicing parameters in the slicing software of the 3D printer to implement slicing and to generate a support; and preparing a printing material, comprising preparation of a raw material and processing of the raw material into a printing filament coil.

3. The method of claim 1, wherein the step of processing the workpiece after printing, upon the printing of the workpiece is finished, comprises, sequentially, the steps of: debinding the workpiece; sintering the workpiece; and removing a support part.

4. The method of claim 3, wherein debinding the workpiece, upon the printing of the workpiece is finished, comprises the steps of:

preheating the workpiece in a catalytic debinding furnace;

ventilating to clean an atmosphere in the catalytic debinding furnace; and charging an acid solution for debinding when the catalytic debinding furnace is stabilized.

5. The method of claim 3, wherein sintering the workpiece comprises positioning a debinded sample into a sintering furnace for sintering when the workpiece is debinded.

6. The method of claim 3, wherein removing the support part comprises removing the support part of the workpiece by a physical method when the workpiece is sintered to obtain the finished workpiece.

* * * * *